United States Patent Office 2,994,199
Patented Aug. 1, 1961

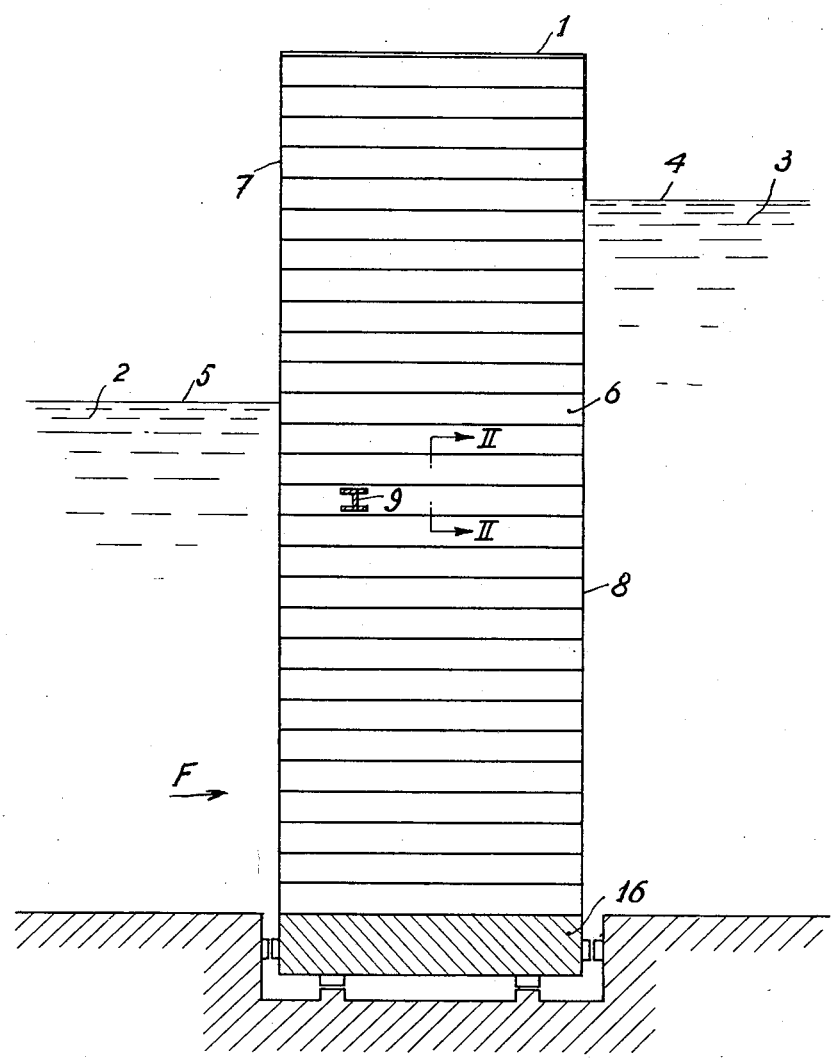

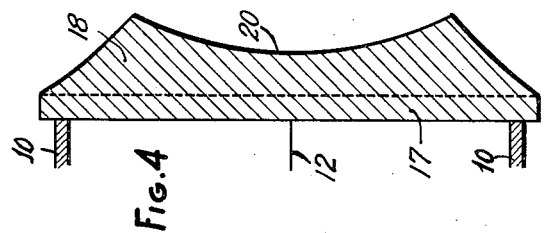
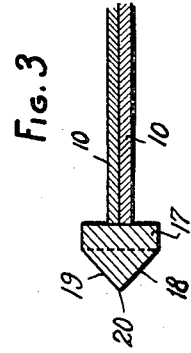
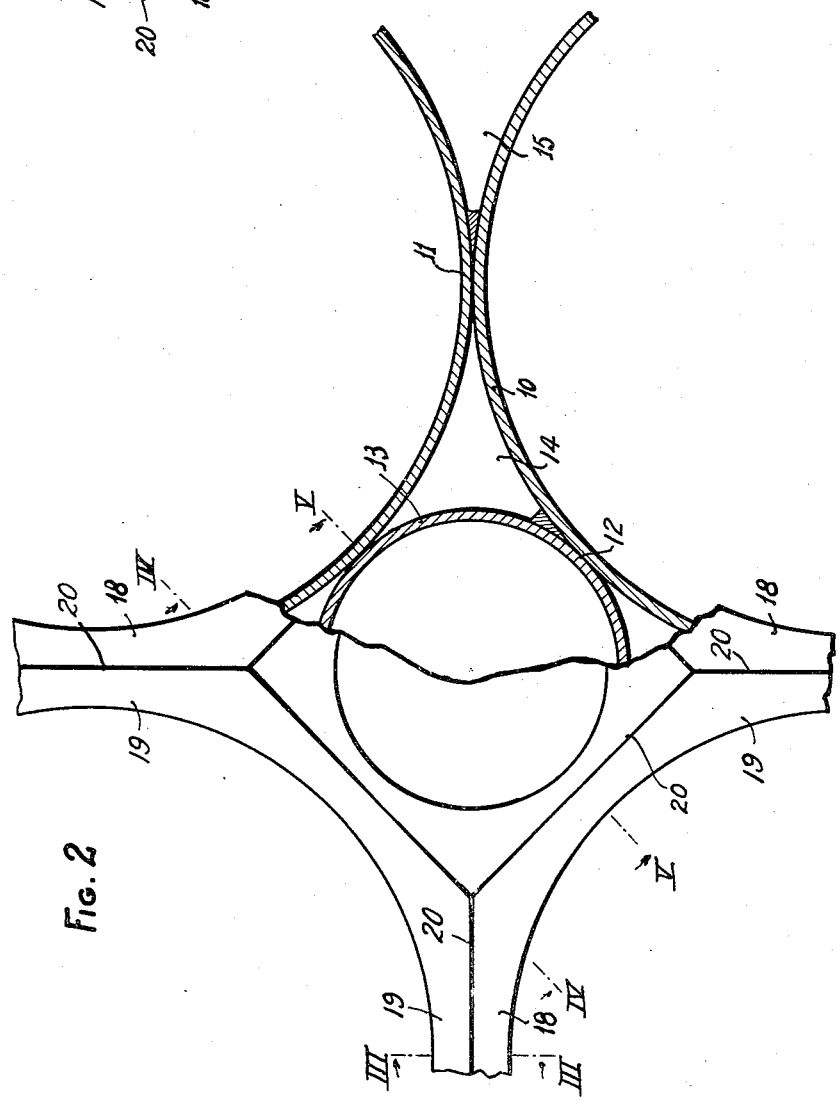

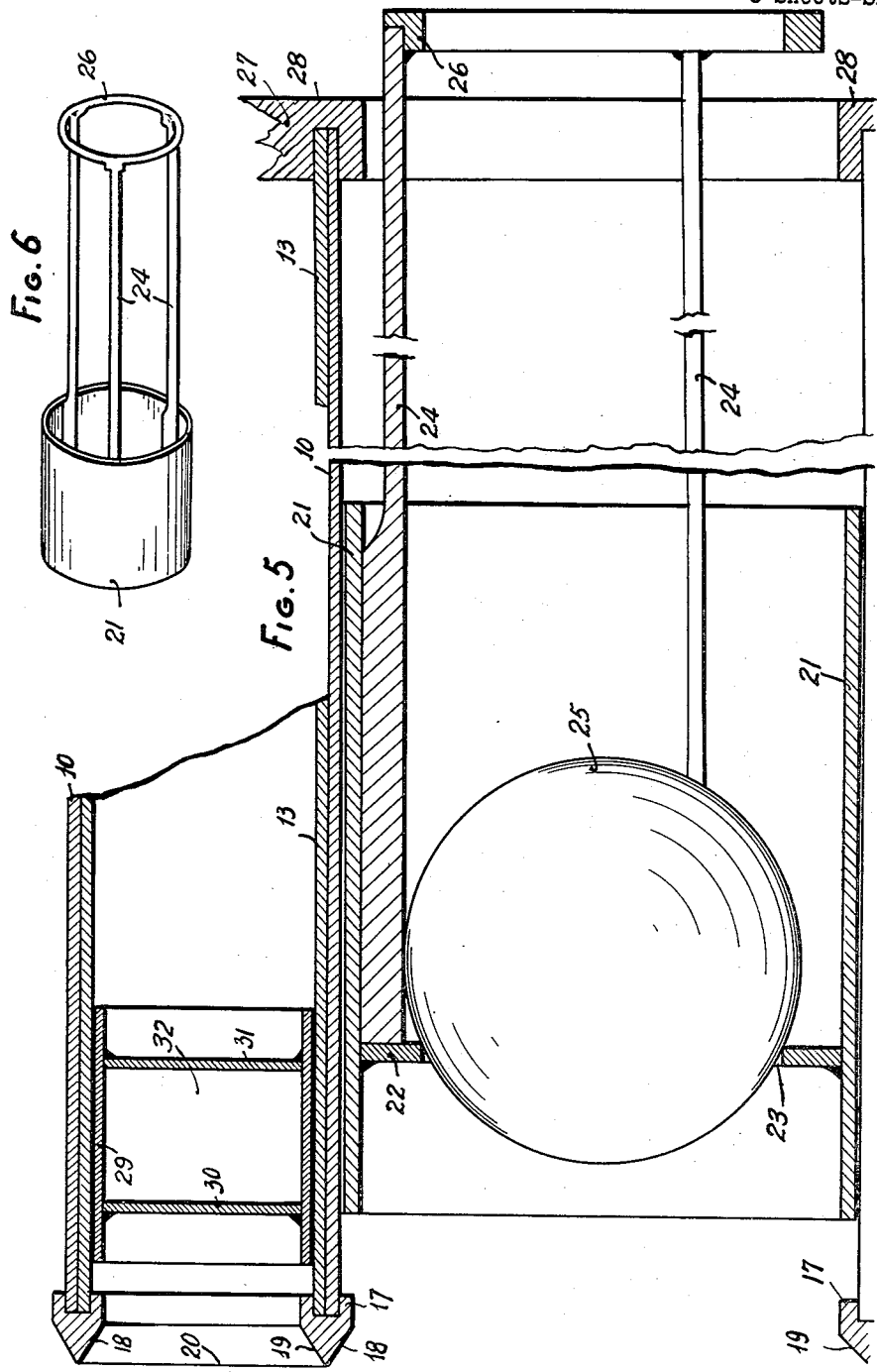

2,994,199
WALL STRUCTURE FOR SEPARATING TWO
BODIES OF LIQUID
Antoine Hervé Martin, 11, rue Parchappe, Dakar,
French West Africa
Filed Apr. 1, 1958, Ser. No. 725,571
Claims priority, application France Apr. 3, 1957
6 Claims. (Cl. 61—4)

This invention relates to a wall structure for separating two bodies of liquid at different liquid levels, and is more especially applicable to sluice-gates and similar harbour structures for separating the sea from an inland canal or the like.

A principal object of the invention is to provide improved wall structure, for harbours and the like, which will be better able to withstand high-power surge waves, such as might be generated by a nuclear explosion or earthquake in the sea at a certain distance from the structure, than any structure heretofore available.

A broader object is to provide strong, lightweight separating wall structure for separating two bodies of liquid in at least one of which high-pressure surge waves are liable to occur.

Another object is to provide an improved sluice-gate construction.

According to one aspect of the invention, there is provided in structure separating a higher-level body of liquid from a lower-level body of liquid in which surge waves are liable to be generated, recesses extending through said structure between the opposite sides thereof, and displaceable pressure-responsive means in said recesses normally positioned by the pressure differential between said bodies in a position to seal said recesses but displaceable in response to a surge wave to a position in which said recesses are opened to pass said surge wave from said lower-level to said higher-level body of liquid.

The above and further objects, aspects and features of the invention will appear as the disclosure proceeds. In the accompanying drawings, given by way of illustration but not of limitation, FIG. 1 is a diagrammatic view in transverse cross section of a harbour sluice-gate or separating wall according to one embodiment of the invention;

FIG. 2 is a detailed fragmentary view on an enlarged scale, partly in section on line II—II of FIG. 1;

FIGS. 3, 4 and 5 are sections on lines III—III, IV—IV and V—V of FIG. 2 respectively;

FIG. 6 is a perspective view of a piston assembly of FIG. 5.

In the embodiment illustrated in the drawings, the invention is more specifically shown as applied to a harbour wall structure or sluice-gate 1, see FIG. 1, erected between the sea 2 and a canal 3 in which the water at all times retains a higher level 4 than the water level 5 at high tide.

When it is recalled that a harbour sluice gate is ordinarily many times ten meters in length, from 15 to 25 meters high and from 6 to 10 meters thick or deep, it will be understood that with the conventional construction used in present-day sluicegates the gate would be unable to withstand the exceedingly violent shock waves of the kind produced by an atomic or thermonuclear explosion occurring in the sea 2 at some distance from the gate 1. Such shock waves travel at velocities of many thousands of meters per second and would strike the seaward surface 7 of the gate with an impact pressure of several kilograms per second per square centimeter of exposed surface and with an energy of many hundreds of kilogrammeters. Similar considerations may apply to tidal waves, and shock-waves generated by ocean-bottom earthquakes.

The invention, in order to enable the sluice gate or wall to withstand such shock waves, contemplates providing said wall, as shown in FIG. 1, in the form of a plurality of contiguous horizontal tubes or pipes 6 extending across the sides 7 and 8 of the wall and each pipe receiving therein, in substantially sealed sliding relationship with the pipe wall, a movable piston 9 (only one of which is indicated in FIG. 1). All the pipes such as 6 are firmly interconnected into a sealed unitary structure providing the frame of the gate.

Since the constituent pipes 6 are open at both ends it will be understood that the pressure difference due to the difference in water level across the gate permanently exerts a force on all the pistons 6 urging them towards the side 7 of the gate wall, so that all the pistons normally are positioned flush with said side 7 and they are prevented from escaping from out of the pipes as will be later described in detail, so that the gate or wall performs its water retaining function.

An exemplary construction of the said gate will be described in greater detail with reference to FIGS. 2 to 6. In this construction the sluice gate or wall essentially comprises a set of tubes 10 of circular cross section, having an outer diameter of say 1200 millimeters and a wall thickness of about 10 mm., all adjacent tubes being preferably welded with one another along generatrices such as 11, so that any adjacent two pipes are tangential to each other. Mounted in the gap provided between four adjacent tubes 10, such as the gap 14 or 15 indicated in FIG. 2, is a smaller diameter tube or pipe 13, having an outer diameter of about 496 millimeters in the example under consideration. The tubes 13 are welded to each of the surrounding tubes 10 along generatrices such as 12. Thus the entire framework of the sluice gate will be seen to comprise a set of horizontal tubes welded to one another in tangential relationship and providing a rigid unitary framework structure.

The spaces such as 14 and 15 have their open ends at each side of the wall or gate are sealed by means of suitable cover elements, which are integral with the outer frame 16 (see FIG. 1) of the wall. Such outer frame per se forms no part of the present invention.

Thus, on the seaward side 7 of the wall, the said sealing or cover elements are generally designated 17 (FIGS. 3 to 5) and are preferably so formed as to present two converging inclined surfaces 18 and 19 which intersect to define sharp ridges 20 projecting from the sealing elements 17. The purpose of this configuration, as will more clearly appear at a later point, is to reduce the forces developed on the fixed elements of the gate on impact of a high-power shock wave.

As previously noted the pipes 10 and 13 both receive pistons 9 slidable therein. The pistons mounted in the large-diameter pipes 10, see FIGS. 5 and 6, each comprise a cylindrical body portion 21 having a plate 22 welded across one end of it said plate being formed with a wide concentric aperture 23. Welded to and projecting from the opposite end of the cylindrical portion 21 are e.g. three guide rods 24 serving as guide-ways for a hollow ball member 25 adapted to seat within the aperture 23 so as to seal it. Aperture 23 and the hollow ball member 25 cooperating therewith form valve means preventing passage of water through the piston in the position shown in FIG. 5 and adapted to pass water through the aperture 23 when the ball member 25 is displaced on the guide rods 24 to abut against ring 26. The three guide rods 24 have their far ends interconnected by a ring 26 welded thereto and serving to limit the displacement of ball 25 in the opposite direction.

The sealing elements for the ends of pipes 10 and 13 on the inland side 8 of the gate comprise annular elements 27 having flat opposite faces 28 and providing stop means both for the pistons received in pipes 10 and for the pistons received in the pipes 13 as now to be described.

Each piston assembly received in a small-diameter pipe 13 comprises a cylinder section 29, see top of FIG. 5, having solid plates 30 and 31 welded across it in spaced relation with each other. The spacing between plates 30 and 31 is preferably so predetermined that the air pocket retained therebetween within the gap 32 will substantially detract from or preferably cancel the weight of the piston assembly at the particular depth at which said piston is positioned in the normal or average conditions of water level.

As previously mentioned the pistons 9 are normally positioned by the pressure differential at the seaward end of the related pipes, and they are there blocked against further outward movement by abutment of the corresponding ends of the cylindrical piston elements 21 and 29 against cooperating surfaces of the cover elements 17, as will be apparent from FIG. 5. In this condition the balls 25 are sealed to seal the apertures 23.

Assuming now that a shock wave strikes side 7 of the gate in the direction indicated by arrow F in FIG. 1, the pistons 9 are forced back towards the side 8 so that substantially no force is taken by the wall surface 7 of the gate 1 itself. Hence, at the time of impact (this time to be designated to hereafter), the force developed on the gate and its supports is no higher than the force acting on the fixed elements of the gate, primarily the sealing elements 17. Since the combined surface area of the sealing elements 17 represents but a small percentage of the total surface area of the side 7 of the gate, about 18% in the example shown herein, it will be seen that this feature in itself very greatly reduces the effect of a shock wave in generating a surge pressure on the side 7. Actually, as a result of the particular configuration imparted to the sealing elements including the inclines 18 and 19, the effective percentage is further considerably reduced, it being found in practice that in the illustrated constructions said percentage is no higher than about 6% rather than 18%. Thus, only 6% of the total force developed by the impact of the shock wave is supported by the wall surface 7 at the time of initial impact, while the remaining 94% are taken up by the pistons 9.

At a certain time $t_1$ subsequent to the time $t_0$ at which the shock wave has struck, the pistons 9 strike the opposite side 8 of the gate thereby producing a further impact force. However during the displacement of the pistons a major part of the energy delivered to them by the wave is taken up in compressing the water and thus dissipated. It can be shown mathematically that at the time $t_1$ the energy actually exerted on the surface 8 of the wall 1 is only about one eighth part of the original energy which set the pistons 9 into motion, that is 94%:8=12% approx.

This 12% energy at the time $t_1$ is further reduced since at that time the ball 25 disengage the apertures 23 which they were sealing. Assuming the combined section area of the openings 23 is about 60% that of the pipes 10, it is seen that at the time $t_1$ the impact sustained by the wall surface 8 only representing 40% of the residual 12% energy, that is an impact corresponding to about 4.8% of the total initial energy.

Now designating by $t_2$ the further time at which the balls 25 are stopped by the abutments 26, it will be understood that prior to the time $t_2$ a major part of the energy exerted on the balls 25 has further been dissipated in the body of compressed water, so that at the time $t_2$ the fresh force applied to the gate is only on the order of about 3%.

On the basis of the foregoing, it is finally seen therefore that where a conventional sluice gate was subjected at the instant $t_0$ to an energy of E, a sluice gate according to the invention would be subjected to approximately the following impact energies at successive instants of time:

At the time:

$t_0$ ---------------------------------- 0.06 E
$t_1$ ---------------------------------- 0.05 E
$t_2$ ---------------------------------- 0.03 E

It will readily be understood that under such circumstances a sluice-gate constructed in accordance with the teachings of the invention can easily be so constructed as to be capable of withstanding shockwaves generated by atomic and thermonuclear explosions occurring in the sea within quite short distances from the sluice-gate.

It will be understood that the exemplary sluice-gate construction described and illustrated by way of example may be modified in a variety of ways without departing from the scope of the invention. Thus, pipe elements of other than circular cross section, e.g. square or oval, may be used. Whereas the structure illustrated involves the use of pipe elements of two different diameters, pipes having only a single diameter, or more than two different diameters, may be used. The form of damping means associated with the pipes may likewise differ from the forms shown in connection with each type of pipe, 10 and 13, illustrated herein.

What I claim is:

1. Structure for separating a higher-level from a lower-level body of water, comprising a plurality of open-ended pipes extending across said structure and secured to provide a self-supporting structure, the open ends of said pipes facing, respectively, the high and low bodies of water, sealing means sealing the gaps between adjacent pipes, piston means sealingly slidable in said pipes between a normal position adjacent the lower-level body and a displaced position adjacent the higher-level body, said piston means being normally retained in said normal position by the pressure difference between said water levels and displaced to said other position by a high pressure surge occurring in said lower-level body, and valve means in at least some of said piston means movable between an open and a closed position and moving in said displaced position of the piston means under the influence of a pressure surge to said open position to pass said pressure surge from said lower-level to said higher-level body of water.

2. Structure for separating a higher-level from a lower-level body of water, comprising a plurality of open-ended pipes assembled in parallel contacting relation to provide a self-supporting structure, the open ends of said pipes facing, respectively, the high and low bodies of water, means sealing the gaps between adjacent pipes at least on that side of the structure directed towards said lower-level body, and piston means slidable in said pipes between a normal position adjacent the lower-level body and a displaced position adjacent the higher-level body, including valve means in at least some of said piston means movable between an open and a closed position and moving in said displaced position of the piston means under the influence of a pressure surge to said open position to pass a pressure surge from the lower level to the higher-level body of water.

3. Structure as claimed in claim 2, wherein said sealing means comprise converging taper surfaces defining taper ridges directed towards said lower-level body of water.

4. Structure as claimed in claim 2, wherein said at least some piston means each comprise a cylindrical tubular body portion slidable in a related one of said recesses, means defining a valve seat within said body portion, a spherical valve member normally seated against said seat in said body portion, another seat supported from said body portion in axially spaced relation with said first seat, and perforate guide means for said valve member extending between said body portion and said other seat, said piston means being mounted in its pipe with said first seat directed towards said lower-level body of water whereby a pressure surge in said lower-level body will first force said piston means bodily to its displaced position and will then force said valve member from its first seat to its other seat to provide a flow passage for said pressure surge to said higher-level body of water.

5. Structure for separating a higher-level from a lower-level body of water, comprising a plurality of open-ended pipes assembled in parallel contiguous relation to provide a self-supporting structure, first piston means sealingly slidable in first ones of said pipes and second piston means sealingly slidable in second ones of said pipes, each piston means slidable between a normal position adjacent the lower-level body and a displaced position adjacent the higher-level body so as to be moved from said normal to said displaced position by a pressure surge occurring in said lower-level body, aperture means in said first piston means, and means normally sealing said aperture means and displaceable by said pressure surge relative to said first piston means after the latter means has been moved to its displaced position to open said aperture means and provide a flow passage for said surge towards said higher-level body of water.

6. Structure as claimed in claim 5, wherein said second piston means each comprise a cylindrical tubular member slidable in an associated one of said pipes, and a pair of plates sealingly secured across said tubular member in axially spaced relation, so as to entrap therebetween a body of air imparting substantial buoyancy to said second piston means.

References Cited in the file of this patent

UNITED STATES PATENTS

| | | |
|---|---|---|
| 1,597,371 | Gfeller | Aug. 24, 1926 |
| 2,441,759 | Gay | May 18, 1948 |

FOREIGN PATENTS

| | | |
|---|---|---|
| 407,575 | France | Jan. 4, 1910 |
| 1,033,112 | France | Apr. 1, 1953 |
| 758,566 | Great Britain | Oct. 3, 1956 |